US011579673B2

(12) United States Patent
Cheng et al.

(10) Patent No.: US 11,579,673 B2
(45) Date of Patent: Feb. 14, 2023

(54) SYSTEMS AND METHODS FOR STORING FSM STATE DATA FOR A POWER CONTROL SYSTEM

(71) Applicant: Quanta Computer Inc., Taoyuan (TW)

(72) Inventors: Hsien-Yang Cheng, Taoyuan (TW); Ying-Che Chang, Taoyuan (TW); Ya-Chau Yang, Taoyuan (TW)

(73) Assignee: QUANTA COMPTER INC., Taoyuan (TW)

( * ) Notice: Subject to any disclaimer, the term of this patent is extended or adjusted under 35 U.S.C. 154(b) by 62 days.

(21) Appl. No.: 17/243,220

(22) Filed: Apr. 28, 2021

(65) Prior Publication Data
US 2022/0350386 A1 Nov. 3, 2022

(51) Int. Cl.
G06F 1/26 (2006.01)
G06F 3/06 (2006.01)
(Continued)

(52) U.S. Cl.
CPC ............ *G06F 1/26* (2013.01); *G05B 19/042* (2013.01); *G06F 1/28* (2013.01); *G06F 1/30* (2013.01); *G06F 3/0619* (2013.01); *G06F 3/0656* (2013.01); *G06F 3/0659* (2013.01); *G06F 3/0673* (2013.01); *G06F 13/1668* (2013.01); *G06F 13/4282* (2013.01); *G05B 2219/21109* (2013.01); *G05B 2219/25268* (2013.01); *G06F 2213/0016* (2013.01)

(58) Field of Classification Search
CPC ..... G06F 1/26; G06F 1/28; G06F 1/30; G06F 3/0619; G06F 3/0656; G06F 3/0673; G06F 13/1668; G06F 13/4282; G06F 2213/0016; G05B 19/042; G05B 2219/21109; G05B 2219/25268
See application file for complete search history.

(56) References Cited

U.S. PATENT DOCUMENTS

2008/0046707 A1* 2/2008 Hirai .................. G06F 1/26 713/1
2021/0064491 A1* 3/2021 Chang ................ G06F 11/2284

FOREIGN PATENT DOCUMENTS

CN 108804275 A * 11/2018
CN 108984368 A * 12/2018
CN 110515802 A * 11/2019

OTHER PUBLICATIONS

EPO Machine translation for CN 110515802A (Year: 2019).*
EPO Machine translation for CN 108804275A (Year: 2018).*
EPO Machine translation for CN 108984368A (Year: 2018).*

* cited by examiner

Primary Examiner — Glenn A. Auve
(74) Attorney, Agent, or Firm — Nixon Peabody LLP

(57) ABSTRACT

A system and method for logging state data from a power system control device on a computer system is disclosed. The computer system includes a power system supplying power to the computer system. The power system has a power-up sequence having a plurality of stages. The power system control device is coupled to the power system. The power system control device includes a finite state machine circuit having states corresponding to the stages of the power-up sequence. The control device also has a write controller, a storage buffer, and a communication interface. The write controller writes the state of the finite state machine circuit in the storage buffer. An external controller is coupled to the communication interface and is operable to read the stored state data.

20 Claims, 6 Drawing Sheets

(51) Int. Cl.
*G06F 13/42* (2006.01)
*G05B 19/042* (2006.01)
*G06F 13/16* (2006.01)
*G06F 1/28* (2006.01)
*G06F 1/30* (2006.01)

```
450
                               452                            454
2021-01-24  11:59:53.910]
2021-01-24  11:59:53.910]     [DEBUG]CPLD  reg.  0x40:   0xa, 0xb      DC on
2021-01-24  11:59:53.910]
2021-01-24  11:59:53.910]     [DEBUG]CPLD  reg.  0x41:   0xc, 0xd
2021-01-24  11:59:53.910]
2021-01-24  11:59:53.910]     [DEBUG]CPLD  reg.  0x42:   0xe, 0x13
2021-01-24  11:59:53.910]
2021-01-24  11:59:53.910]     [DEBUG]CPLD  reg.  0x43:   0x11, 0x12   DC off
2021-01-24  11:59:53.910]
2021-01-24  11:59:53.910]     [DEBUG]CPLD  reg.  0x44:   0x12, 00
2021-01-24  11:59:53.910]
2021-01-24  11:59:53.910]     [DEBUG]CPLD  reg.  0x45:   00, 00
2021-01-24  11:59:53.910]
2021-01-24  11:59:53.916]     [DEBUG]CPLD  reg.  0x46:   00, 00
2021-01-24  11:59:53.917]
2021-01-24  11:59:53.917]     [DEBUG]CPLD  reg.  0x47:   00, 00
2021-01-24  11:59:53.917]
```

FIG. 4B

SYSTEMS AND METHODS FOR STORING FSM STATE DATA FOR A POWER CONTROL SYSTEM

TECHNICAL FIELD

The present disclosure relates generally to operating reliability in computer systems. More particularly, aspects of this disclosure relate to a routine for storing the state from a finite state machine controlling a voltage regulator for a power-up sequence in a computer system for debugging purposes.

BACKGROUND

A typical computer system such as a server generally includes hardware components such as processors, memory devices, network interface cards, power supplies, and other specialized hardware on a main board. Computer systems have a basic input/output system (BIOS). The BIOS is used to test basic inputs and outputs from the hardware components before booting up the computer system.

Server architecture is typically centered around a central processing unit (CPU). Complex computer systems, such as servers, use a baseboard management controller (BMC) to manage basic system operations such as power management, hardware error checking, etc. Typically, power systems such as a power supply unit (PSU) for a server are managed by a dedicated power system control circuit such as a complex programmable logic device (CPLD). The CPLD is programmed to manage the power-up and power-down sequences for the power system.

In a typical server architecture, a Finite State Machine (FSM) executed by the CPLD manages the power-up routine for the power system. The FSM is designed based on the power-up sequence for the power system service described on a Platform Design Guide (PDG) from the vendor of the CPU. Thus, the FSM includes states that correspond with the steps in the power-up sequence. The states of the FSM are used to control a voltage regulator on the main board of the power supply unit to complete the power-up and power-down sequence of the computer system.

In the development or maintenance phase of a start-up sequence for a computer system such as a server, an unexpected short circuit failure or abnormal operating behavior will cause the FSM executed by the CPLD to stall at a state corresponding to a step of the power-up sequence, before reaching the final state. This results in a failure of the start-up routine since the FSM will not reach the final state to complete the power-up of the power system. However, there is presently no way to determine what stage in the power-up sequence caused the failure. The debug process to resolve this type of malfunction is always time-consuming because of the complex process of examining the entire server system to determine the error.

Thus, there is a need for a routine to store state data from a power system controller in a buffer for a computer system that allows efficient troubleshooting when a power-on sequence fails. There is a further need for a routine that allows the storage of states of a finite state machine for retrieval by an external controller. There is also a need for different storage routines for storage of the finite state data.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

One disclosed example is a computer system including a power system supplying power to the computer system. The power system includes a power-up sequence having a plurality of stages. A power system control device is coupled to the power system. The power system control device includes a finite state machine circuit having states corresponding to the stages of the power-up sequence. The power system control device also includes a write controller, a storage buffer, and a communication interface. The write controller stores the state of the finite state machine circuit in the storage buffer. An external controller is coupled to the communication interface operable to read the stored state data.

A further implementation of the example system is an embodiment where the computer system is a server. Another implementation is where the control device is a programmable device. Another implementation is where the control device is one of: a complex programmable logic device or a field programmable gate array. Another implementation is where the external controller is a baseboard management controller. Another implementation is where at least one of the stages corresponds with more than one of the states of the finite state machine. Another implementation is where the communication interface is coupled to the external controller via an I2C bus. Another implementation is where the storage buffer includes a plurality of registers. A predetermined number of registers are dedicated to storing the state data. The write controller stores the state data from the finite state machine into one of the registers when the finite state machine changes state. Another implementation is where the write controller resets the plurality of registers when the start-up sequence changes stages. Another implementation is where the write controller resets one of the plurality of registers when the plurality of registers is full.

Another disclosed example is a method of storing state data from a finite state machine executed by a power control circuit on a computer system. A power-up sequence of a power system having a plurality of stages is initiated. The state of a finite state machine executed by a power system controller is changed based on the power-up sequence. The state of the finite state machine is written in a storage buffer of the controller via a write controller. The stored states are communicated via a communication interface to an external controller.

Another implementation of the example method is where computer system is a server. Another implementation is where the control circuit is a programmable device. Another implementation is where the control circuit is one of: a complex programmable logic device or a field programmable gate array. Another implementation is where the external controller is a baseboard management controller.

Another implementation is where at least one of the stages corresponds with more than one of the states of the finite state machine. Another implementation is where an I2C bus is coupled between the communication interface and the external controller. Another implementation is where the storage buffer includes a plurality of registers. A predetermined number of registers are dedicated to storing the state data. The state data from the finite state machine is written into one of the registers when the finite state machine changes state. Another implementation is where the plurality of registers is reset when the start-up sequence changes stages. Another implementation is where one of the plurality of registers is reset when the plurality of registers is full.

Another disclosed example is a computer-program product tangibly embodied in a non-transitory machine-readable storage medium. The product includes instructions configured to cause a controller to perform operations including initiating a power-up sequence of a power system having a plurality of stages. The operations include executing a finite state machine having a plurality of states corresponding to the plurality of stages. The operations include changing the state of a finite state machine based on the stage of the power-up sequence. The operations include writing the state of the finite state machine in a storage buffer of the controller via a write controller. The operations include communicating the stored states via a communication interface to an external controller.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 4B is a table showing the log results of the finite state machine during a power-on sequence according to certain aspects of the present disclosure;

Figure 1:
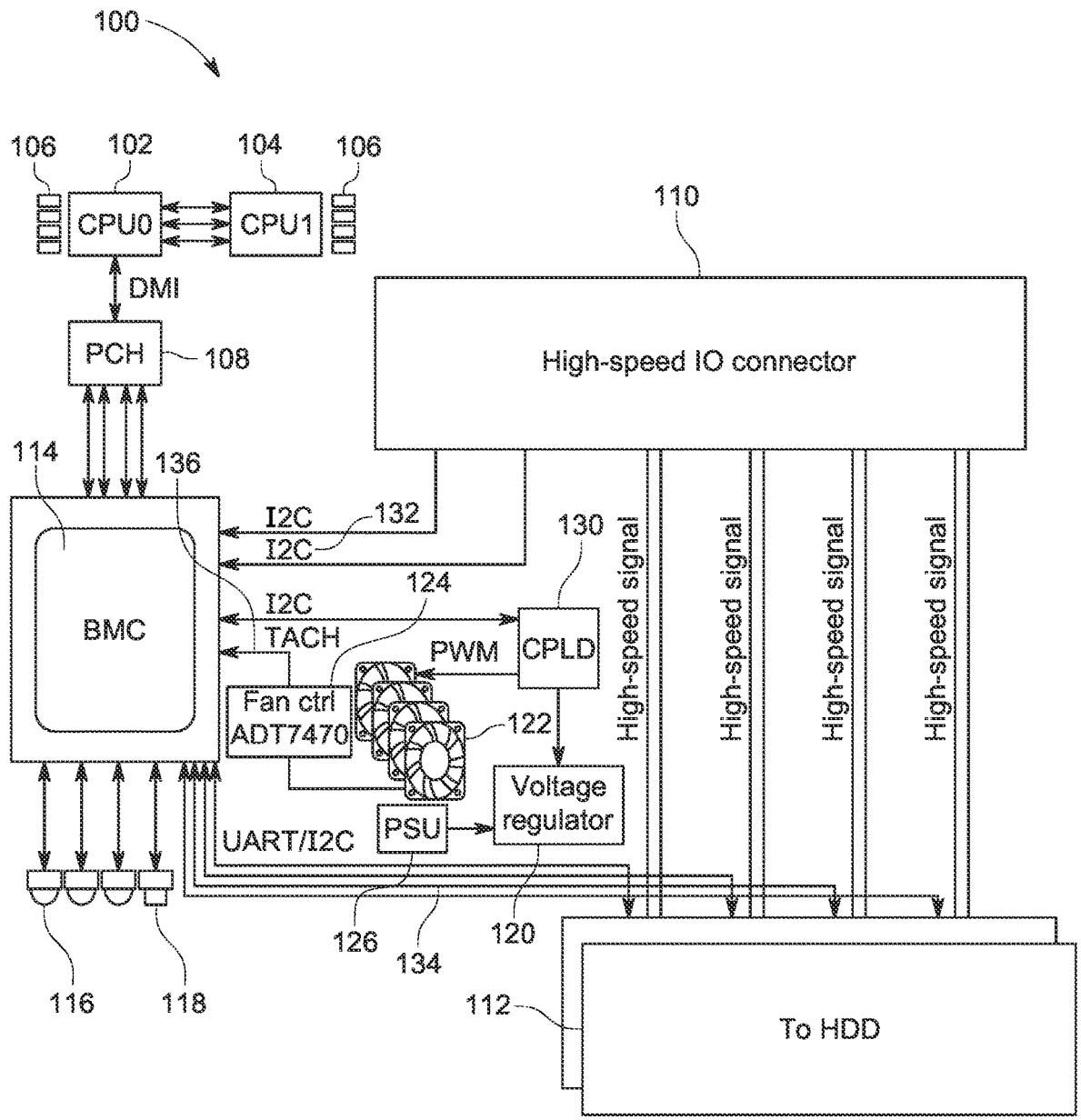
FIG. 1 is a block diagram of an example computer system that uses an example routine to store state data from a dedicated programmable controller for the power system, according to certain aspects of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

The present disclosure relates to a routine for a complex programmable logic device (CPLD) that uses a finite state machine (FSM) to control the power system on a computer system. The routine causes the CPLD to transfer state data from the finite state machine to be recorded in a storage buffer of the CPLD. The routine also allows an external controller such as a baseboard management controller (BMC), to read the historical state data from the memory buffer of the CPLD. The historical state data may be analyzed to assist in troubleshooting a failed power-up of the power system.

In order to ease the effort of debugging, the historical transferred state data recorded in the storage buffer of the CPLD may be read when the system is powered on or powered off, and when an abnormality occurs. The external controller can read out all recorded information through a two-wire communication interface such as an Inter-Integrated Circuit (I2C) bus, to allow a technician to analyze the failure further.

FIG. 1 shows a computer system 100 that executes an FSM-based routine that stores the FSM state data to facilitate debugging of the computer system 100. The computer system 100 may include multiple central processing units (CPUs) 102 and 104 that have respective memories in the form of dual in line memory modules (DIMMs) 106. The CPUs 102 and 104 are coupled to a platform controller hub 108. The computer system 100 includes a high-speed IO connector 110 that allows connection to external storage devices, a connector for hardware devices 112 such as hard disk drives, and a baseboard management controller (BMC) 114. The PCH 108 is coupled to the BMC 114 and coordinates communication between the CPUs 102 and 104 and the other components in the computer system 100. The BMC 114 is an external controller that monitors operations for the computer system 100. In this example, the BMC 114 may be coupled to a series of optical indicators 116 such as LEDs that indicate the different states of the operation of the computer system 100. The BMC 114 may also be coupled to a power button 118 that allows an operator to initiate the power-up sequence.

A series of components support the computational and storage elements that may be connected to the connectors 110 and 112. These components include a voltage regulator 120, a series of fans 122, and a fan controller 124. In this example, the voltage regulator 120 is connected to a power supply unit (PSU) 126 that is, in turn, part of a power system that provides power to the components of the computer system 100. A power system controller device, which in this example is a CPLD 130, manages the power-up sequence of the power system to ensure provision of power to the computer system 100. Thus, the power-up sequence managed by the CPLD 130 is part of the overall power-up routine for the computer system 100 that includes ensuring that the other components such as the processor, storage devices, and other peripheral devices are operating properly. The CPLD 130 enables the voltage regulator 120 to start supplying power provided by the PSU 126 in accordance with the overall power-up routine. The CPLD 130, in this example, is programmed for power system related control and monitoring functions such as executing a Joint Test Action Group (JTAG) I2C bus interface, a fan control routine, and a power-up/down sequence.

The BMC 114 is coupled to the CPLD 130 via a two-wire communication interface such as an I2C bus 132. The BMC 114 receives operational data through other I2C buses such as an I2C bus 134. Other components such as the fan controller 124 provide a tachometer output 136 to the BMC 114 for monitoring the airflow generated by the fans 122.

Figure 2:
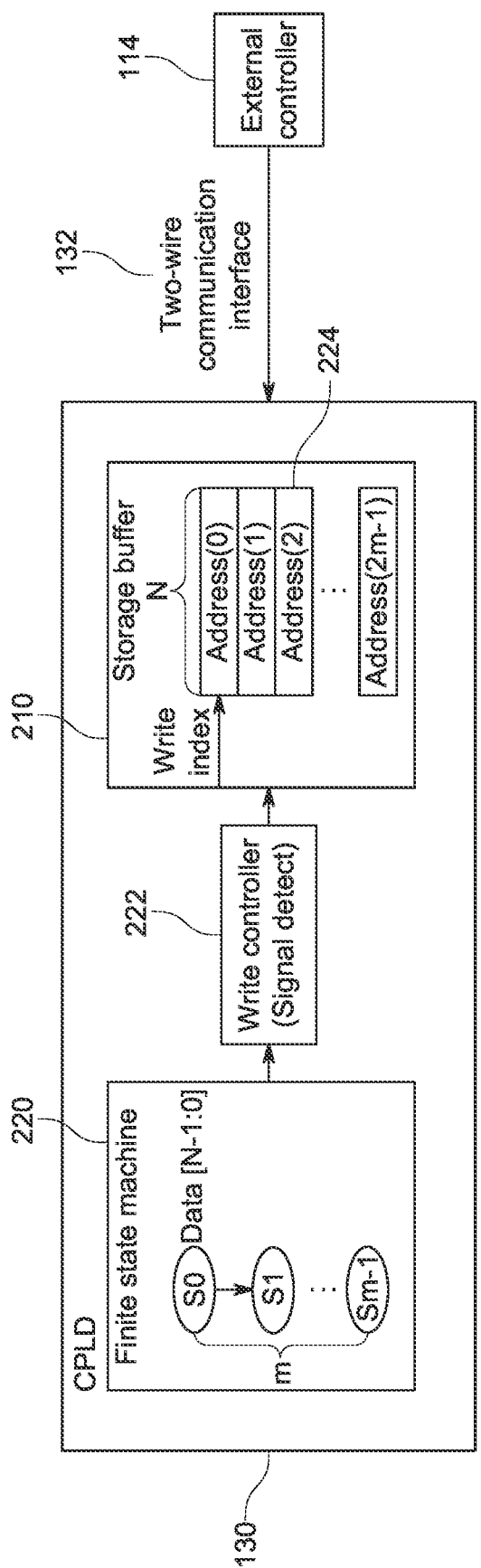
FIG. 2 is a block diagram of the components programmed from the dedicated controller of the power system in the computer system in FIG. 1, according to certain aspects of the present disclosure.

FIG. 2 is a block diagram of the CPLD 130. The CPLD 130 in this example is a MachXO2 CPLD manufactured by Lattice, but other similar devices may be used. The CPLD 130 in this example is programmed to perform monitoring and control functions for the power system. The CPLD 130 includes a storage buffer 210. In this example, the CPLD 130 is programmed to execute a finite state machine (FSM) 220 to assist in a power-up sequence for the power system. The CPLD 130 is also programmed to execute a write controller 222. In this example, the storage buffer 210 has eight registers 224 that are dedicated to storing state data from the FSM 220. In this example, each of the eight registers 224 has 16 bits. As explained below, in this example, each register 224 may store two hex values corresponding to two states of the FSM 220. The registers 224 can each save two state changes of the FSM 220, and therefore 16 state changes of the FSM 220 may be saved in the storage buffer 210. Of course, more or less registers of the storage buffer 210 may be dedicated to storing the state data.

The FSM 220 is programmed to keep track of different states related to the sequence of steps for the power-up sequence of the power system. Once the FSM 220 has reached the final state, the power-up sequence is completed and the CPLD 130 signals to the computer system 100 that the power-up sequence has been completed. In cases of an error during the power-up sequence, the FSM 220 will not proceed to the next state.

The example power-up sequence uses hardware logic circuits on the CPLD 130 and external controllers to provide the ability to obtain historical FSM state data. The CPLD 130 is configured to perform write control via the write controller 222. The example process also allocates certain predetermined number of registers in the storage buffer 210 of the CPLD 130 to store the state data from the FSM 220. During the power-on process, the write controller 222 writes state data from the FSM 220 to the storage buffer 210.

Thus, when an error occurs, since state data from the FSM 220 is transferred to the storage buffer 210, historical information on the state of the FSM 220 is recorded. The CPLD 130 allows an external controller, such as the BMC 114, to read out the historical state data from the storage buffer 210 of the CPLD 130.

The newly added control circuit programmed in the CPLD 130 detects the finite state machine state and under certain conditions sends the state for storage to the storage buffer 210. The data received by the storage buffer 210 is stored in an order specified by the mode of the storage buffer 210. An external controller (such as the BMC 114) can read the storage buffer 210 through a two-wire communication interface when a sudden failure occurs. The external controller may then print a timing trace from the oldest to most recent event based on the index of the written data.

Figure 3:
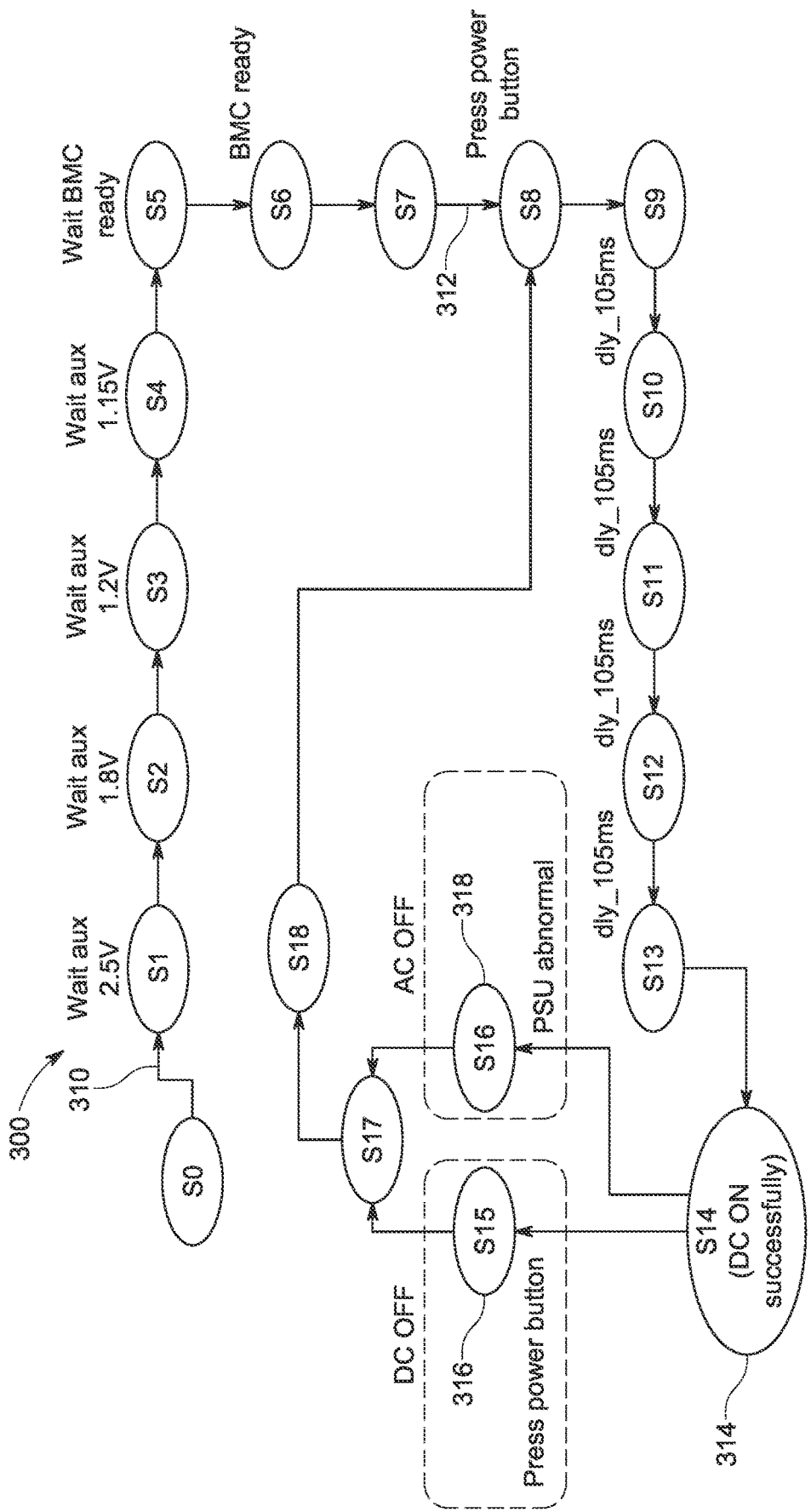
FIG. 3 is a state diagram of the finite state machine executed by the dedicated programmable controller in the computer system in FIG. 1, according to certain aspects of the present disclosure.

FIG. 3 shows an example state diagram 300 for the finite state machine 220. In this example, there may be 18 states that reflect different stages in the power-on sequence. In this example, the power-on sequence includes an AC-ON stage, a DC-ON wait stage, a DC-ON stage, a DC-OFF stage, and an AC-OFF stage. In this example, the write controller 222 records the state of the FSM 220 in the storage buffer 210, according to a predetermined linear or circular mode based on either state changes or stage changes. Any number of states reflecting the different stages in the power-on sequence may be used. Thus, changing the state of the finite state machine is based on an individual stage of the power-up sequence.

The AC-ON stage is initiated when external AC power is connected to the power system and corresponds to the FSM 220 changing from state 0 to state 1 (310). The state of the FSM 220 is recorded in the storage buffer 210 according to the linear routine. The AC-ON stage is recorded while FSM 220 changes from state 1 to state 7. In this example, state 2 is activated when the auxiliary 2.5 Volt power output is detected and a power enable for the auxiliary 1.8 Volt power output is sent. State 3 is activated when the auxiliary 1.8 Volt power output is detected. State 4 is activated when the auxiliary 1.2 Volt power output is detected. State 5 is activated when the auxiliary 1.15 Volt power output is detected. State 6 is activated when the BMC is ready.

When the power button 118 in FIG. 1 is pressed, the FSM 220 changes from state 7 to state 8. The write controller 222 erases the registers 224 of the buffer 210 and records the state of the FSM 220. This allows the power system to start initiating the DC-ON wait stage in state 9. States 9-13 constitute the DC-ON wait stage when the DC power is provided by the voltage regulator 120. The FSM 220 progresses from each of the states 9-13 after a predetermined delay such as about 105 ms for each of the states 9-13. After the delay, the FSM 220 progresses to state 14 when the DC power is turned on successfully constituting the DC-ON stage (314). When the power button is pressed again, the FSM 220 moves to state 15 constituting the DC-OFF stage (316). The states 17-18 constitute a period until the power button 118 is pressed again triggering state 8. The write controller 222 continues to record the states of the FSM 220 during a normal power-off sequence. Alternatively, if the power supply unit malfunctions, the FSM 220 may move to state 16 corresponding to the AC-OFF stage (318).

Recording the states of the FSM 220 in FIG. 3 may facilitate error(s) in troubleshooting. Based on the external signals input to CPLD 130 from the voltage regulator 120 of the power supply unit, the FSM 220 can decide the next state of operation. Sometimes, a malfunction or delay from other components cause those external signals to indicate a power system component failure and the resulting abnormal signals lead to an incorrect FSM state sequence. By reviewing the recorded state of the FSM 220, a technician can find out which possible signals caused the system to fail quickly. The technician can make such diagnosis by network communication with the BMC 114 to review the data on a remote terminal.

Figure 4A:
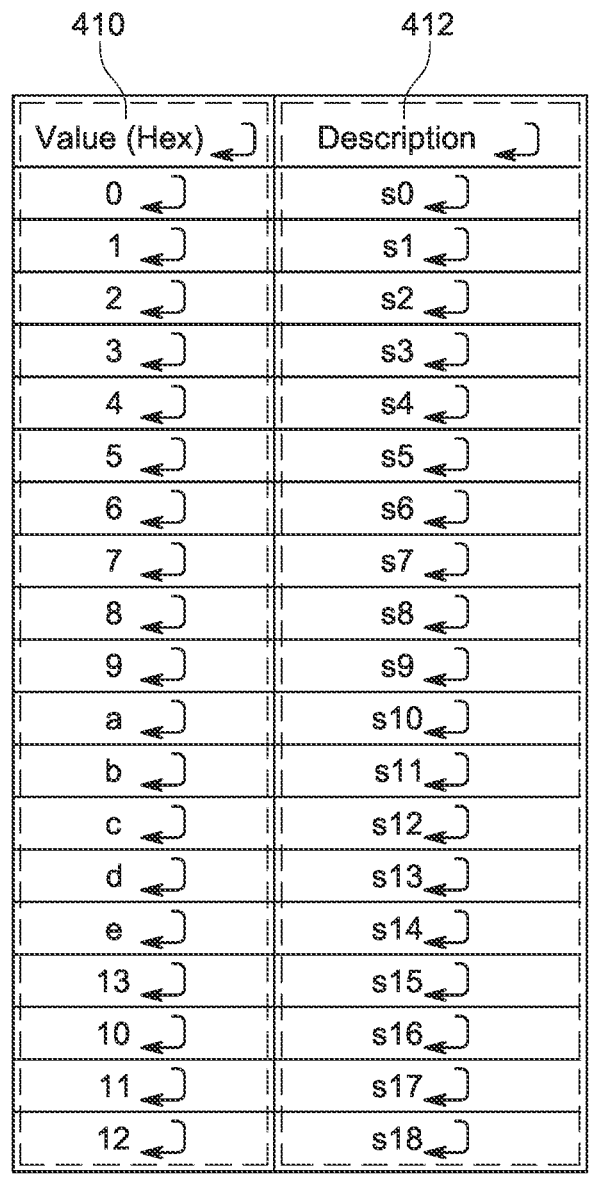
FIG. 4A is a table of the registers and states corresponding to a power system power-on sequence of the finite state machine, according to certain aspects of the present disclosure.

FIG. 4A is a table that shows an example correlation between the state of the FSM 220 and the corresponding hex value that may be stored in the registers 224 in the storage buffer 210 to represent the state. A hex value column 410 shows the nineteen hex values that may be stored in any of the eight registers allocated from the storage buffer 210. A state column 412 shows the state of the FSM 220 corresponding to the hex value in column 410. For example, state 0 from FIG. 3 is stored as hex value 0, while state 11 is stored as hex value b. Thus, the hex values stored by the eight registers constitute a log with sixteen stage change entries that may be read by the external controller to determine the state of the FSM 220. The log may be read to determine the state change of the FSM 220 when the power-on sequence was interrupted.

FIG. 4B shows the log results from the BMC 114 reading the storage buffer 210 of the CPLD 130 to determine a malfunction in the power system. The log results include a time stamp column 450, a register column 452, and a hex value column 454. The register column 452 shows the particular one of the eight registers (0x40 through 0x47) of the storage buffer 210 that records the hex value corresponding to the state change of the FSM 220 at the particular time. As explained below, the registers are overwritten according to either a circular or linear mode.

In the log results, the BMC 114 provides the log after a DC-ON stage is completed, but a malfunction is encountered. In this example, the register 0x40 shows a hex value of a and b, indicating that the FSM changed from state 10 to state 11 based on the table in FIG. 4A. The next register, 0x41, shows hex values of c and d, indicating that the FSM changed from state 12 to state 13 during the next time period. This indicates that the DC-ON stage was entered based on the state diagram in FIG. 3. The next register, 0x42 shows hex values of e and 13, indicating that the FSM 220 changed from state 14 to state 15 during the next time period. The next register, 0x44 shows hex values of 11 and 12, indicating that the FSM 220 changed from state 17 to state 18, indicating that the DC-OFF was reached. Finally, the register 0x44 shows hex values of 12 and 00, indicating that the FSM 220 changed from state 18 to state 0. The remaining registers 0x45 to 0x47 show the FSM 220 remained in state 0 for the remaining time.

Through the data in the example log results in FIG. 4B, a technician may determine that the final state 17 of the FSM 220 corresponds to the DC-OFF stage. The DC-OFF stage leads to the failure to read the data by the BMC 114 and other hardware components of the computer system 100 such as the CPUs 102 and 104 in FIG. 1. However, the CPLD 130 operates from auxiliary power and thus continues to store the state of the FSM 220.

As shown in FIGS. 3 and 4B, the shutdown behavior may be either a result of the AC-OFF (state 16, hex value 10) stage (318) or the DC-OFF stage (state 15, hex value 13) (316). Since the log indicates the last state before reset was state 15 (hex value 13 in register 0x42), the technician can determine that the reason for the shutdown behavior was because of entry into the DC-OFF stage. As the only signal that can trigger the "DC OFF" stage is the power button, a technician can conclude that the malfunction is caused by a faulty power button.

As explained above, in this example, the number of registers used in the storage buffer 210 of the CPLD 130 is limited, necessitating a storage strategy for rewriting previously stored data. Thus, either the circular or linear mode may be used by the routine to decide when to store FSM state data in the storage buffer 210 and when the registers 224 in the storage buffer 210 should be cleared. In this example, the circular mode is used when the number of registers in the storage buffer 210 is limited. The circular mode may also be used to test the power cycle to record state changes in context. The linear mode is generally used to confirm that solutions for the detected errors are successful. Of course, other controllers may have greater internal storage capacity and not require retention strategies. When the circular mode is used, the write controller 222 writes the current state of the FSM 220 into the storage buffer 210 using a write index whenever a state change occurs. Thus, the newest FSM state change will overwrite the oldest FSM state change when the registers 224 of the storage buffer 210 are full. When the linear mode is used, the write controller 222 writes the current state of the FSM into the registers 224 of the storage buffer 210 and resets all the registers 224 when each stage of the power-up sequence is completed. Alternatively, the registers 224 may be reset at the completion of certain stages of the power-up sequence to store state changes for multiple stages.

Figure 5:
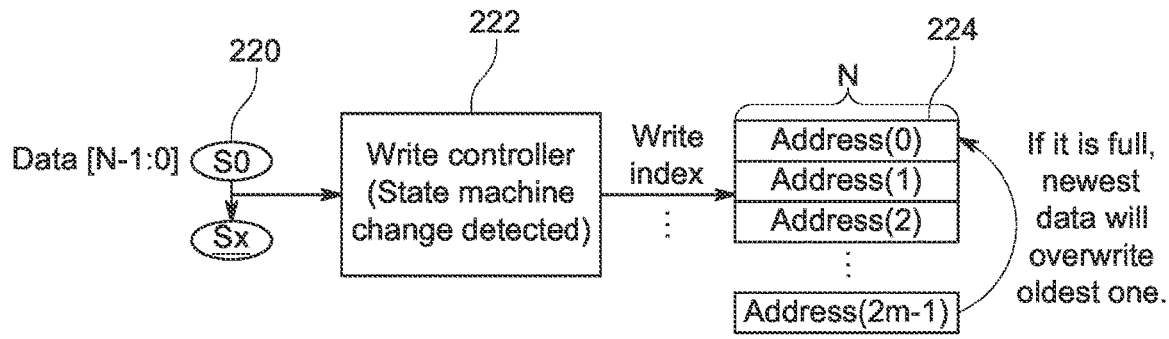
FIG. 5 is a block diagram of the process of a circular mode of the finite state machine in FIG. 1, according to certain aspects of the present disclosure.

FIG. 5 shows an example implementation of the circular mode in the routine for storage executed by the CPLD 130. Like elements in FIG. 5 are labeled with like reference numerals as their counterparts in FIG. 2. In the circular mode, the write controller 222 writes the current FSM state into the next available register 224 in the storage buffer 210 when the FSM 220 changes states. When the registers 224 of the storage buffer 210 are full, the CPLD 130 uses a write index to overwrite the register 224 storing the oldest FSM state change with the most recent state change.

Figure 6:
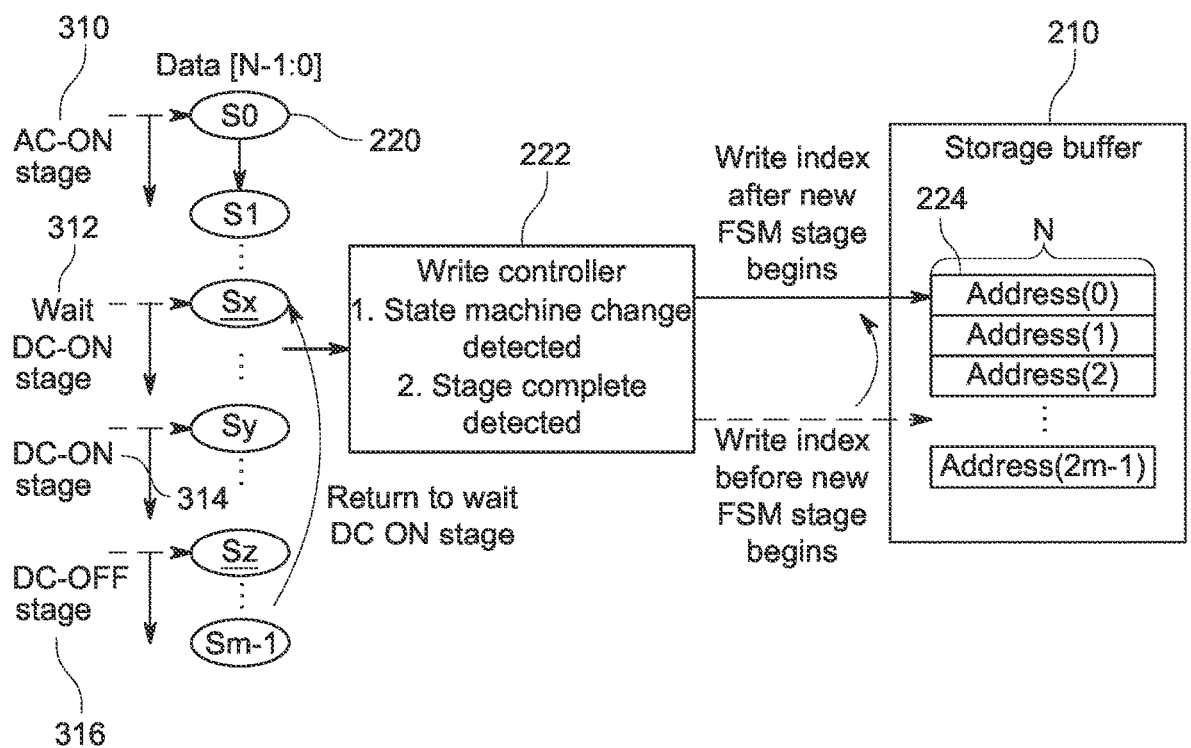
FIG. 6 is a diagram of the process of a linear mode of the finite state machine in FIG. 1, according to certain aspects of the present disclosure.

FIG. 6 shows an example implementation of the linear mode in the routine for storage executed by the CPLD 130. Like elements in FIG. 6 are labeled with like reference numerals as their counterparts in FIG. 2. In this mode, the write controller 222 will always record the current state of the FSM 220 into the registers 224 of the storage buffer 210. As explained above, the power-up/down sequence of the computer system 100 includes four stages, the AC-ON stage 310, the wait for DC-ON stage 312, the DC-ON stage 314, and the DC-OFF stage 316. Each stage corresponds to a different state of the FSM 220 as shown in FIG. 3. In the linear mode, when a particular stage begins, the write index will be reset to zero by the write controller 222, thus clearing the registers 224. During the stage, each of the states of the FSM 220 are written into the registers 224 when the state changes.

An example of the write sequence controlled by the write controller 222 in the linear mode may be as follows in relation to the state diagram in FIG. 3 and the process diagram in FIG. 6. When the power-on stage is at the AC-ON stage 310, the FSM 220 starts to change state. The write controller 222 causes the FSM state data to be stored into the registers 224 of the storage buffer 210 until the AC-ON stage 310 is completed. At this time, if the external controller (BMC 114 in FIG. 1) reads the storage buffer 210 from the CPLD 130, the resulting log allows a technician to clearly determine the state changes during the period of AC-ON stage.

After the AC-ON stage 310, the routine starts the wait for the DC-ON stage 312. The write controller 222 resets the write index to zero if a user turns on the computer system 100 by pushing the power button to start the DC-ON stage 312. The registers 224 will thus be cleared and the write controller 222 writes the FSM state data to the registers 224 of the storage buffer 210 starting with the first register. At this time, if the external controller reads the storage buffer 210 from the CPLD 130, the resulting log allows a technician to determine the state changes during the period of waiting for the DC-ON stage 312.

After waiting to initiate the DC-ON stage 312, the routine starts the DC-ON stage 314 and the write controller 222 resets the write index to zero. The registers 224 will thus be cleared and the write controller 222 writes FSM state data to the registers 224 of the storage buffer 210 starting with the first register. At this time, if the external controller BMC 114 reads the storage buffer 210 from the CPLD 130, the resulting log allows a technician to clearly know the state changes during the DC-ON stage 314.

After the DC-ON stage 314, the routine starts to enter the DC-OFF stage 316 when the power button is pressed again. The write controller 222 resets the write index to zero. The registers 224 will thus be cleared and the write controller 222 writes FSM state data to the registers 224 of the storage buffer 210 starting with the first register. After the DC-OFF stage 316, the system will return to the wait for the DC-ON stage 312 and the write controller 222 resets the write index to zero again.

In this example, the power system control circuit may be a dedicated circuit device such as the complex programmable logic device (CPLD), an application specific integrated circuit (ASIC) or a field programmable gate array (FPGA) that implements the state recording function. Other combinations of general controllers or processors may be used with a separate storage device such as a DRAM, EEPROM, or the like, for storing the state data from the FSM 220. If the power system control circuit is a dedicated specialized circuit device such as an ASIC, the functions are designed in the hardware itself. If the power system control circuit includes programmable hardware such as a CPLD or an FPGA, the device hardware may be programmed before installation in the computer system 100.

The above described routine in FIGS. 3, 5 and 6 are representative of example machine-readable instructions for the CPLD 130 in FIG. 2 to perform FSM state data storage. In this example, the machine-readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can, alternatively, be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic device, etc.). For example, any or all of the components of the interfaces can be implemented by software, hardware, and/or firmware. Also, some or all of the machine-readable instructions represented by the flowcharts may be implemented manually. Further, although the example routine is described herein, persons of ordinary skill in the art will readily appreciate that many other methods of implementing the example machine-readable instructions may alternatively be used.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A computer system comprising:
a power system supplying power to the computer system, the power system having a power-up sequence having a plurality of stages;
a power system control device coupled to the power system, the power system control device including a finite state machine circuit having states corresponding to the plurality of stages of the power-up sequence, a write controller, a storage buffer including registers, and a communication interface, wherein the write controller stores a hexadecimal code representing the state of the finite state machine circuit in a register of the storage buffer; and an external controller coupled to the communication interface, the external controller operable to read the stored hexadecimal code.

2. The system of claim 1, wherein the computer system is a server.

3. The system of claim 1, wherein the control device is a programmable device.

4. The system of claim 3, wherein the control device is one of: a complex programmable logic device or a field programmable gate array.

5. The system of claim 1, wherein the external controller is a baseboard management controller.

6. The system of claim 1, wherein at least one of the stages corresponds to more than one of the states of the finite state machine.

7. The system of claim 1, wherein the communication interface is coupled to the external controller via an Inter-Integrated Circuit (I2C) bus.

8. The system of claim 1, wherein
the write controller stores the state data from the finite state machine into one of the registers when the finite state machine changes state.

9. The system of claim 8, wherein the write controller resets the plurality of registers when the power-up sequence changes stages.

10. The system of claim 8, wherein the write controller resets one of the plurality of registers when the plurality of registers is full.

11. A method of storing state data from a finite state machine executed by a power control circuit on a computer system, the method comprising:
initiating a power-up sequence of a power system, the power-up sequence having a plurality of stages;
changing a state of a finite state machine executed by a power system controller based on the power-up sequence;
writing a hexadecimal code representing the state of the finite state machine in a register of a storage buffer of the power system controller via a write controller; and
communicating the stored hexadecimal code representing the state of the finite state machine via a communication interface to an external controller.

12. The method of claim 11, wherein the computer system is a server and the external controller is a baseboard management controller.

13. The method of claim 11, wherein the control circuit is one of: a complex programmable logic device or a field programmable gate array.

14. The method of claim 11, wherein at least one of the stages corresponds to more than one of the states of the finite state machine.

15. The method of claim 11, wherein the communication interface is coupled to the external controller via an Inter-Integrated Circuit (I2C) bus.

16. The method of claim 11, wherein
the state of the finite state machine is written into one of the registers when the finite state machine changes state.

17. The method of claim 16, wherein the plurality of registers is reset when the power-up sequence changes stages.

18. The method of claim 16, wherein one of the plurality of registers is reset when the plurality of registers is full.

19. A computer-program product tangibly embodied in a non-transitory machine-readable storage medium, including instructions configured to cause a controller to perform operations including:
initiating a power-up sequence of a power system having a plurality of stages;
executing a finite state machine having a plurality of states corresponding to the plurality of stages;
changing the state of the finite state machine based on an individual stage of the power-up sequence;
storing the state of the finite state machine in a storage buffer of the controller via a write controller; and
communicating the stored state via a communication interface to an external baseboard management controller.

20. A computer system comprising:
a power system supplying power to the computer system, the power system having a power-up sequence having a plurality of stages;
a power system control device coupled to the power system, the power system control device including a finite state machine circuit having states corresponding to the plurality of stages of the power-up sequence, a write controller, a storage buffer, and a communication interface, wherein the write controller stores the state of the finite state machine circuit in the storage buffer; and
an external baseboard management controller coupled to the communication interface, the external baseboard management controller operable to read the stored state data.

* * * * *